(12) United States Patent
Smith

(10) Patent No.: US 9,986,831 B2
(45) Date of Patent: Jun. 5, 2018

(54) STRUCTURE PROTECTOR

(71) Applicant: A-FAX LIMITED, Elland, Yorkshire (GB)

(72) Inventor: Luke Smith, Elland (GB)

(73) Assignee: A-FAX LIMITED, West Yorkshire (GB)

( * ) Notice: Subject to any disclaimer, the term of this patent is extended or adjusted under 35 U.S.C. 154(b) by 0 days. days.

(21) Appl. No.: 15/022,447

(22) PCT Filed: Sep. 16, 2014

(86) PCT No.: PCT/GB2014/052806
§ 371 (c)(1),
(2) Date: Mar. 16, 2016

(87) PCT Pub. No.: WO2015/036803
PCT Pub. Date: Mar. 19, 2015

(65) Prior Publication Data
US 2016/0227928 A1    Aug. 11, 2016

(30) Foreign Application Priority Data

Sep. 16, 2013 (GB) .................................. 1316459.5
Sep. 16, 2013 (GB) .................................. 1316460.3
Sep. 16, 2013 (GB) .................................. 1316461.1

(51) Int. Cl.
*A47B 95/00* (2006.01)
*A47B 95/04* (2006.01)
(Continued)

(52) U.S. Cl.
CPC .............. *A47B 95/043* (2013.01); *B65G 1/02* (2013.01); *F16F 1/44* (2013.01); *B65G 2207/40* (2013.01); *E01F 15/141* (2013.01)

(58) Field of Classification Search
CPC .... A47B 95/043; E01F 15/141; E04F 19/026; B65G 2207/40
See application file for complete search history.

(56) References Cited

U.S. PATENT DOCUMENTS 6,289,836 B1 *  9/2001  Tellex ...................... E02B 3/26
                                                      114/219
6,625,950 B1 *  9/2003  Shreiner ............. E04F 11/1804
                                                      52/288.1
(Continued)

FOREIGN PATENT DOCUMENTS

AU     2011221368 A1    3/2012
CN      202864183 U     4/2013
(Continued)

OTHER PUBLICATIONS

Nov. 26, 2013 Search Report issued in British Patent Application No. 1316459.5.
(Continued)

*Primary Examiner* — Bradley Duckworth
(74) *Attorney, Agent, or Firm* — Oliff PLC

(57) ABSTRACT

The protector is generally elongate and includes a mouth that is able to open to accommodate the structure. The mouth is biased towards a closed position so that the mouth grips the structure to hold it in place. The mouth is provided by a pair of opposed jaws and an inner plate provided to act as a stop for the mouth. A bumper is provided that extends spaced from the inner plate. The protector further includes at least one angled linear web that extends between the inner plate and bumper at a front of the protector. Advantageously, it has been found that as the bumper crushes, the angled linear web and the side connection of the bumper combine to cause the bumper to spread outwardly and around the structure thereby acting to deflect the force of the impact (Continued)

around the structure. Such deflection reduces the damage to the structure.

10 Claims, 3 Drawing Sheets

(51) Int. Cl.
*B65G 1/02* (2006.01)
*F16F 1/44* (2006.01)
*E01F 15/14* (2006.01)

(56) References Cited

U.S. PATENT DOCUMENTS

| | | | | |
|---|---|---|---|---|
| 7,770,861 | B2* | 8/2010 | Huxtable | A47B 95/043 248/345.1 |
| 8,267,262 | B2* | 9/2012 | Thelwell | B65G 1/02 211/183 |
| 8,939,419 | B2* | 1/2015 | Wallace | B32B 7/02 248/345.1 |
| 9,414,677 | B2* | 8/2016 | Sahm, III | A47B 95/043 |
| 2002/0178684 | A1* | 12/2002 | Barnett | A47B 95/043 52/716.1 |
| 2005/0005565 | A1* | 1/2005 | McSharry | E04F 19/026 52/716.5 |
| 2008/0029676 | A1* | 2/2008 | Huxtable | A47B 95/043 248/345.1 |
| 2008/0149581 | A1* | 6/2008 | Clarke | A47B 91/00 211/183 |
| 2014/0196997 | A1* | 7/2014 | Michael | E01F 15/141 188/377 |
| 2016/0235202 | A1* | 8/2016 | Ramon | A47B 95/043 |

FOREIGN PATENT DOCUMENTS

| | | |
|---|---|---|
| GB | 2250313 A | 6/1992 |
| WO | 93/22528 A1 | 11/1993 |
| WO | 2005/049453 A1 | 6/2005 |
| WO | 2005/075745 A1 | 8/2005 |

OTHER PUBLICATIONS

Nov. 26, 2013 Search Report issued in British Patent Application No. 1316460.3.
Mar. 31, 2014 Search Report issued in British Patent Application No. 1316461.1.
Jan. 23, 2015 International Search Report issued in International Patent Application No. PCT/GB2014/052806.
Jan. 23, 2015 Written Opinion issued in International Patent Application No. PCT/GB2014/052806.

* cited by examiner

STRUCTURE PROTECTOR

The present invention relates to a protector for protecting a structure from impact, a structure on which a protector is mounted, a method of forming a protector, a method of protecting a structure, and a method of attaching a protector to a structure.

Racking in warehouses are often impacted upon by fork lift trucks. This damages the racking and can cause articles to fall from the shelves. It is known to protect the racking by attaching protectors to the corner structural supports of the racking. However in order to effect the attachment, the mouth of the protector has to be forced open before the ends of the mouth snap back. This makes the protectors dangerous to fit as the hands of the user can be nipped. Furthermore the mouths only fit one size of structural support and accordingly, in order to protect different sized supports, it is necessary to provide mouths of many thickness. In addition if the mouths are not an exact precise fit the protectors can move from side to side on the support. Consequently if the protector is hit by a fork lift truck the protector can slide before being held by the racking thereby increasing the risk of damage to the racking with the protector possibly failing.

It is an object of the present invention to attempt to overcome at least one of the above or other disadvantages. It is a further aim to provide a protector that has increased protection to the structure. It is a further aim to provide a protector that has a reduced tendency to move relative to the structure upon impact. It is a further aim to provide a protector that is easy to install According to the present invention there is provided an apparatus and method as set forth in the appended claims. Other features of the invention will be apparent from the dependent claims, and the description which follows.

In the exemplary embodiments, there is provided a protector for protecting a structure from impact. The protector is generally elongate and includes a mouth that is able to open to accommodate the structure. The mouth is biased towards a closed position so that the mouth grips the structure to hold it in place. Suitably, in the exemplary embodiments, the mouth is provided by a pair of opposed jaws. A member is typically provided to act as a stop for the mouth. Here, the member extends at an angle to the opposed jaws and in conjunction with the opposed jaws provides a boundary that encases a part of the structure to be protected. That is, when the protector is fitted to the structure, the member abuts or is arranged to lie closely adjacent the structure. The member may be periodic, for instance just at the sides of the protector, or, as shown in the exemplary embodiments, the member may be continuous such as a plate. A bumper is provided that extends spaced from the member. The bumper being arranged to protect the structure from impact. Here, the space between the bumper and member creates a crush zone into which the bumper is arranged to crush to absorb impact. In the exemplary embodiments, the substantial parts of the protector are formed integrally. That is, the opposed jaws, bumper and member are formed from as a single component and preferably a single extrusion.

According to one exemplary embodiment, the protector includes at least one non-slip member. Here the non-slip member is arranged on an inside of the mouth of the protector and arranged to contact the structure. Advantageously, this allows the main structure of the protector to be selected based on material characteristics most suited to strength and force absorption, whereas the non-slip member is selected to have a high coefficient of friction so as to provide resistance to movement between the protector and structure upon impact. Such movement can damage or degrade the structure. In the exemplary embodiments, the non-slip member is a plurality of non-slip members. Each non-slip member is elongate and extends substantially the length of the protector. Suitably, each non-slip member is hot melted onto the main parts of the protector.

According to one aspect of the present invention, a protector for protecting a structure from impact comprises the protector being arranged, in use, to be attached to a structure by a pair of opposed jaws, the protector including a bumper arranged, in use, to be spaced from a structure over at least part of its extent, the bumper being arranged to protect the structure when impacted, the protector including at least one non-slip portion arranged, in use, to be contacted by the structure to resist movement of the protector on the structure.

The non-slip portion may be arranged, in use, to contact the structure to resist up and down movement of the structure or alternatively or additionally, side to side movement of the protector on the structure.

At least one of the non-slip portions may be biased towards the structure and that non-slip proportion may be provided on a plate that, in use, is arranged to face the surface of the structure and a plurality of non-slip parallel non-slip portions may be provided.

At least one non-slip portion may be provided at an end region of the jaws. At least one jaw may be moveable towards or away from the other jaw at a hinge and a non-slip portion may be provided in the region of the hinge.

The protector including the non-slip portion may be extruded and may be simultaneously extruded.

The present invention includes a structure on which is mounted a protector as herein referred to.

According to another aspect of the present invention a method of forming a protector for protecting a structure against impact comprises forming a pair of jaws, which jaws are arranged in use to connect the protector to a structure and forming a bumper arranged, in use, to be spaced from the structure over at least part of its extent, the bumper being arranged to protect the structure against impact, and forming a non-slip portion arranged, in use, to be contacted by the structure to resist movement of the protector on the structure.

The method may comprise the protector and the non-slip portions being extruded, for example simultaneously extruded.

According to one exemplary embodiment, there is provided a protector wherein the bumper extends from sides of the protector so as to provide a crush zone that extends from a front of the protector around at least a portion of the side of the protector. The protector further includes at least one linear web that extends between the member and bumper at a front of the protector. Each linear web being connected to the member at a location spaced inside of the front linear edge. Each linear web being connected to the bumper at a location spaced closer to the front linear edge than the location of the connection of the member. Thus each linear web is angled. Advantageously, it has been found that as the bumper crushes, the angled linear web and the side connection of the bumper combine to cause the bumper to spread outwardly and around the structure thereby acting to deflect the force of the impact around the structure. Such deflection reduces the damage to the structure.

According to a further aspect of the present invention a protector for protecting a structure from impact comprises the protector being arranged, in use, to be attached to a structure by a pair of opposed jaws, the protector including a bumper spaced from the ends of the jaws arranged, in use, to be spaced from a structure of at least part of its extent, the protector further including a plate arranged to be located adjacent to the structure, the plate being connected to the bumper by at least one linear where offset from the perpendicular to the plane of the plate whereby, in use, when the bumper is subject to an impact perpendicular to the centre of the plane of the plate, the bumper is moved inwards towards the structure at the region of impact and outwards away from the plate in the region inwards of the sides of the plate with the or each web moving with the bumper in the region of the connection of the web to the bumper whereby the structure is protected from impact.

The web may be arranged to pivot, in use, at its connection to the plate and its connection to the bumper when the bumper is subject to an impact.

The web may be arranged to bend about its length when the bumper is subject to an impact. The web may be of reduced cross section at location spaced from the ends of the web.

At least one of the jaws may include a hinge spaced from its end about which the jaw or jaws can move towards or away from each other and in which the bumper is connected to the or each jaw in the region of the or each hinge.

The jaws may include at least one resilient material at the or each hinge which resilient material is arranged to be compressed or further compressed when the bumper is subject to an impact.

The sides of the bumper may be spaced from the ends of the plate and the side of the bumper may extend inwardly around the ends of the plate. According to a further aspect of the present invention a method of protecting a structure against impact comprises attaching opposed jaws of a protector to the structure, the protector including a bumper spaced from the ends of the jaws and spaced from the structure over at least part of its extent, the protector further including a plate with the plate being located adjacent to the structure and connected to the bumper by at least one linear web offset to the perpendicular to the plane of the plate, whereby, when the bumper is subject to an impact perpendicular to the centre of the plane of the plate, the bumper moves inwards towards the plate at the region of impact and outwards away from the sides of the plate at a region inwards at the sides of the plate with the or each web moving with the bumper in the region of the connection of the web to the bumper to protect the structure from impact.

The method may comprise causing the webs to pivot at the connection to the plate and the connection to the bumper when the protector is impacted.

Alternatively, or additionally, the web may bend about its length when the protector is impacted.

The method may comprise spacing the bumper from the ends of the plate and allowing the bumper to move relative to the plate at their spaced locations from the ends of the plate.

At least one of the jaws may be moveable about a hinge spaced from the end of the jaw with the hinge resiliently biasing the jaw towards the other jaw with the bumper being connected to the jaw in the region of the or each hinge whereby, when the bumper is impacted the resilience of the hinge assists in resisting the impact by the resilient biasing being increased.

The present invention gives a method as herein referred to when using a protector as herein referred to.

According to one exemplary embodiment, there is provided a protector wherein a hinge is provided to cause at least one of the opposed jaws to pivot relative to the member. The hinge connects said opposed jaw to the member. Here the hinge comprises an area of reduced cross-sectional area relative to the connecting part of the opposed jaw and member. The reduced cross-sectional area runs substantially the length of the protector. Advantageously, the reduced cross-sectional area provides a preferentially bending location for said opposed jaw so that when the mouth is opened to locate the protector on the structure said opposed jaw is caused to pivot at the hinge. Advantageously, the strength of the hinge, that is the force required to open the mouth can be controlled by the thickness of the cross-sectional area of the hinge. Yet further, at least one of the inner or outer areas of the hinge can be filled with a second material. Here the second material can be selected to be resilient. Advantageously, the second material may provide the substantial component of the resilient closing force of said opposed jaw. That is, when arranged on the outside, the second material is arranged to be compressed between the opposed jaw and member as the opposed jaw is pivoted to open the mouth. Said compression of the resilient member causes a closing force. Additionally or alternatively, when the second material is arranged on the inside, the second material is connected to a part of the opposed jaw and a part of the member such that as the opposed jaw is opened, the second material is extended. Said extension of the resilient material causing a biasing force to act to close the mouth. Advantageously, the second material can be selected to determine the strength of the hinge. This allows protectors having different hinge strengths to be fabricated using the same process, mouldings and tools simply be using a different second material.

In the exemplary embodiments, two hinges are provided, one for each opposed jaw. Furthermore, although the hinge may be formed at any point, suitably the hinges are provided on the sides of the protector. More suitably, the hinges are provided spaced from the front of the mouth. Here, the member includes an elbow at the front edge of the structure so that the hinge is connected to the ends of the member spaced from the elbow.

According to another aspect of the present invention a protector for protecting a structure from impact comprises the protector being arranged, in use, to be attached to a structure by a pair of opposed jaws, at least one of the jaws including a hinge spaced from the end of the jaw and in which relative movement of the jaws away from each other is arranged to be against a resilient bias of the hinge and a bumper arranged, in use, to be spaced over at least part of its extent from the structure, the bumper being arranged to protect the structure when impacted.

The hinge may include a narrow section and a resilient material may be included on the outside of the protector in the region of the narrow section which resilient material is arranged to be compressed or further compressed when relative movement of the jaws away from each other occurs. Different resilient materials may be provided to the resilient bias.

The protector may include resilient material on the inside of the protector arranged to exert a resilient bias in the region of each hinge arranged to resist relative movement of the jaws towards each other. The resilient bias of the or each jaw may be comprised by resilient material but extends towards the opposed jaw which extends arranged, in use, to be contacted by a structure to be protected. Different resilient materials can be used to alter the resilient bias.

The present invention also includes a structure protected against impact by protector as herein referred to. The jaws may be biased into contact with the structure when attached to the structure.

Movement of the protector on the structure may be at least partially resisted by a non-slip member such as a further resilient material.

According to a further aspect of the present invention a method of forming a protector for protecting a structure against impact comprises forming a pair of opposed jaws and forming at least one of the jaws with a hinge spaced from the end of the jaw and forming a bumper arranged, in use, to be spaced from a structure of at least part of its extent with the bumper being arranged, in use, to protect a structure from impact.

The method may comprise forming a protector as herein referred to.

According to another aspect of the present invention a method of attaching a protector to a structure comprises moving a pair of jaws of the protector relative to each other about a hinge of at least one jaw, which hinges spaced from the ends of the jaw on which it is located and causing the jaws to be biased towards each other to clamp the structure, the protector including a bumper spaced from the structure of at least part of its extent arranged to protect the structure from damage when impacted.

The or each hinge may be moved against originally in bias when relative movement of the jaws away from each other is effected.

A resilient member may be provided in the region of a hinge of at least one jaw which projects towards the other jaw engaging the structure when attaching the protector to the structure.

A method may comprise selecting a protector having a different resilient bias prior to connecting the protector to the structure.

Any of the features referred to herein may be combined. Specifically, the advantageous hinge may be utilised on a protector independently of the improved bumper deflection and improved non-slip feature or in combination with one or both. When combined, advantageously, the hinge may be incorporated to include a non-slip member. Likewise, the bumper may extend from adjacent the hinge. Here the bumper may provide an increased surface against which an external second material is caused to compress against. Furthermore, the improved bumper deflection may be utilised independently of the improved hinge and improved non-slip feature or in combination with one or both. Also, the improved non-slip feature may be utilised independently of the improved bumper deflection or improved hinge or in combination with one or both.

The present invention can be carried into practice in various ways but several embodiments will now be described by way of example and with reference to the accompanying drawings, in which.

Figure 3:
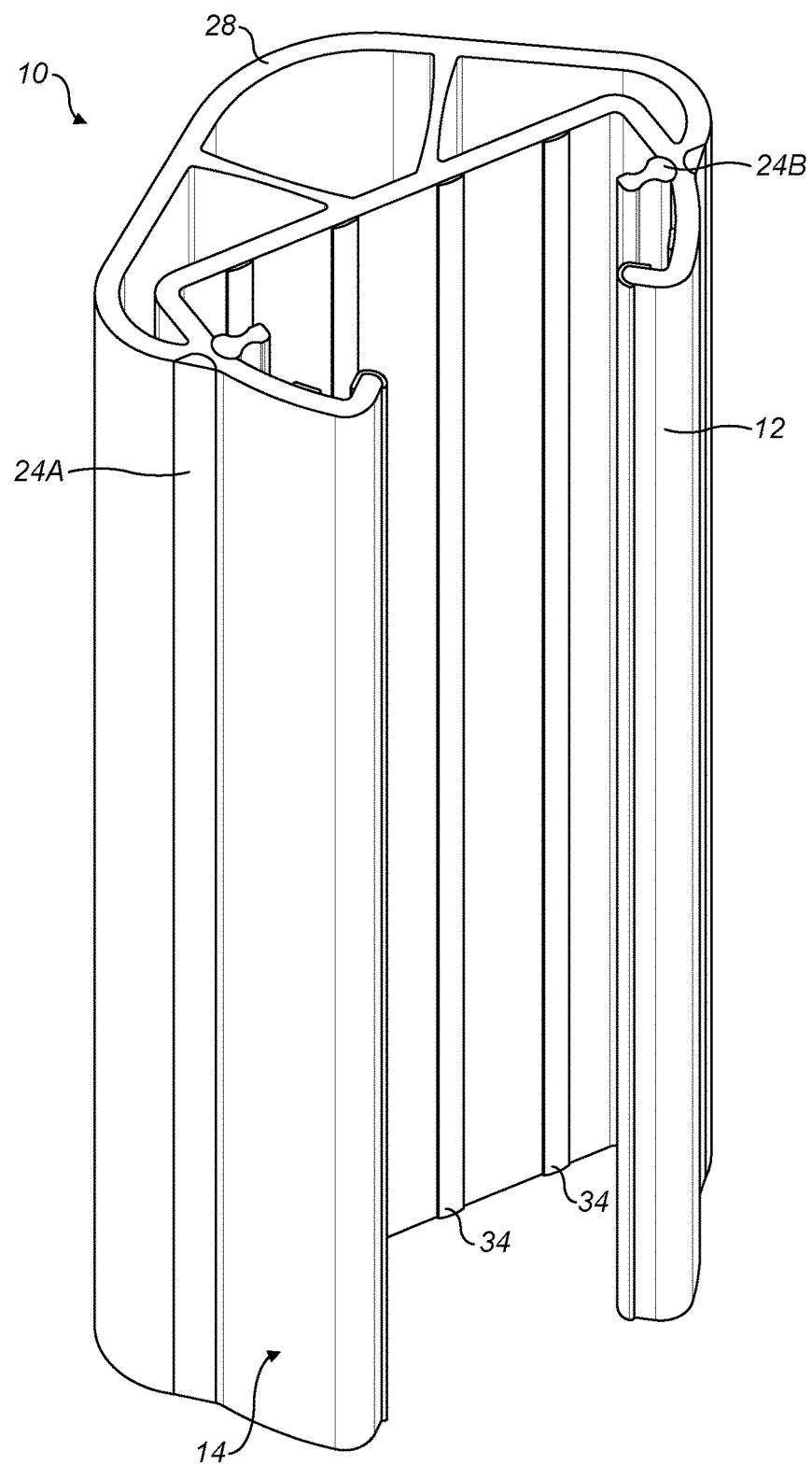
FIG. 3 is an perspective view of a protector.

As shown in FIG. 3 a protector 10 is provided suitable to be attached at a lower region of a structural support 1 in the region where impact from a fork lift truck may impact the protector. The protector 10 is generally elongate and extends along a length of the structure. Suitably, and as herein described, the shape of the protector is such that it can be formed predominantly from a single piece of material as part of an extrusion process. This allows the protector to be extruded from plastic and the length of the protector to be easily changed and increased such that long lengths can be produced. Here, the protector may have a length of greater than five times or greater than 10 times the cross-sectional width of the protector.

Figure 1A:
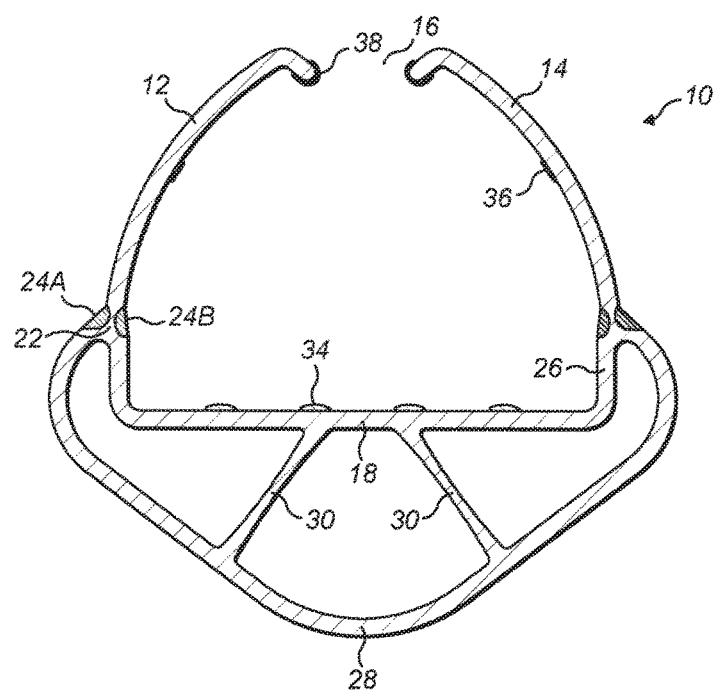
FIG. 1a is a plan view of a protector 10 according to a first embodiment.
Figure 1B:
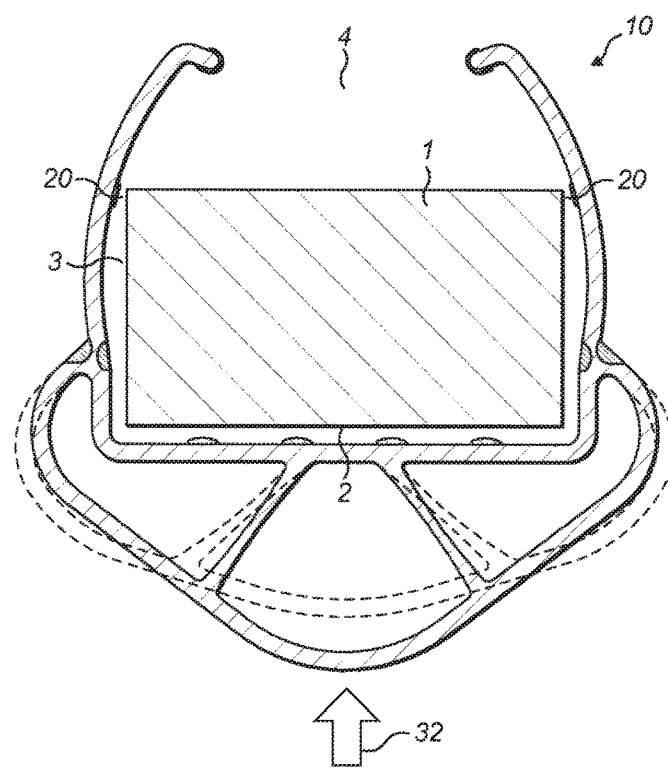
FIG. 1b is a plan view of the protector of FIG. 1 shown attached to a structure.

Referring to FIG. 1a, the protector includes a pair of opposed jaws 12, 14 that trap the structural support in the mouth 16 of the protector. As shown in FIG. 1b, this involves causing the two opposed jaws to move apart, widening the mouth so as to fit the structure through the mouth. Typically, the structure will be selected to be wider than the natural, un-flexed width of the mouth so that the mouth closes on the structure under a resilient closing force. Several protectors may be stacked one on top of the other to achieve the required height.

An outwardly facing surface 2 of the structural support is adjacent to or in contact with an inner plate 18 of the protector. Side faces 3 of the structural support may be adjacent to or in contract with side surfaces 20 of the jaws. Depending on the relative widths, the side surfaces 20 of the jaws may be in contact with the side faces of the structure. Ends 22 of each jaw are connected to the plate 18 by hinges 22. Here, the plate 18 may be substantially planar, such that the hinges are arranged on the front, corner of a structure. However, in the exemplary embodiments shown in the Figures, the plate 18 includes one and preferably two elbows at either side of the protector, wherein the plate 18 bends thereby allowing the hinges to be arranged along a side of the structure, spaced from the front corner. Here, the hinge may be spaced at least 15% or at least 20% of the length of a length of the jaw from the corner. In the exemplary embodiments, the hinge is spaced less than 50% and less preferably less than 30% of the length of the jaw from the corner.

As described, in the exemplary embodiments, in order to attach the protector 10 at least one jaw and preferably both jaws are provided with a hinge 22 about which the jaw flexes. In the exemplary embodiments, the hinge 22 is provided by an area of reduced cross section. The hinge is resiliently flexible. Whilst the strength of the hinge can be determined by the thickness of the material, wherein the resilient nature is provided by the natural resiliency of the material, in the exemplary embodiments it is particularly desirable to provide an additional resilient material 24 which may comprise rubber, may be provided on the outer side or the inner side or both in the region of the hinge. The resilient material may be located in a recess provided at the hinge. Advantageously, it is then the material properties of the additional resilient material that can be used to determine the major part of the resilient force generated by the hinge. This allows protectors having different hinge strengths to be formed from the same extrusion profile simply by modifying the material characteristics and or shape of the additional material that has been located in the recesses about the hinge. It will be appreciated that in the event the resilient nature of the hinge is provided by the additional material, the thickness of the extruded profile at the hinge need only be sufficient to maintain a connection between the plate 18 and jaws. Furthermore, the resilient nature of the additional material is generated by the jaws being connected to the plate such that when the jaws are widened thereby causing the jaws to pivot about the hinge relative to the plate, a part of the jaw moves towards the plate or other part of the protector fixed to the plate and the additional material is arranged such that the movement towards the plate causes the additional material to be compressed.

In FIG. 1 resilient material is provided at both hinges on both jaws on the inside and the outside of the protector. The resilient material 24A on the outside may be compressed or compressed further when the jaw 12 is opened and may urge the jaw inwardly towards, or against the inwardly facing surface 4 of the structural support. The resilient material 24B on the inside of the hinge may maintain the jaw in a set position when a structural member is present. The or each hinge may be spaced from the inner plate 18 by flanges 26 that extend away from the plate 18. The resilient material is suitably co extruded with the plastic extrusion to form the protector.

An external bumper wall 28 extends from each side of the protector spaced from a front corner of the structure. In the exemplary embodiments, the external bumper wall suitably extends from the region of the or each hinge, which bumper wall 28 may be spaced from the inner plate 18 is provided. The external bumper wall is arranged to extend between the two side locations, covering the front of the plate 18 to leave a crush zone between the external bumper wall and plate. Here, the crush zone is arranged to allow the external bumper wall to move into the crush zone upon impact to absorb and dissipate the energy of an impact thereby protecting the structure. Suitably, and as shown in the exemplary embodiments, the external bumper wall is shaped so as to be spaced from the plate 18 at a greatest distance towards the centre of the cross-sectional width of the protector. Here the front bumper slopes backwards to either side of the central peak. The external bumper wall is arranged to extend outwardly from the side of protector and relative to the structure before extending around the front of the plate such that a bulge is formed at the sides of the protector. Here, the bulge provides additional side protection to the protector The bumper wall may be connected to the inner plate 18 by at least one linear web 30. The or each web may extend outwardly at an angle other than 90° with respect to the plane of the outwardly facing surface 2 such as at an inclusive angle of more than 20° or less than 80° or in the region of 60°. The or each web 30 may have a reduced cross section at a middle region. The linear webs 30 are connected between the plate 18 and external bumper wall. The linear webs are connected to the plate spaced from the elbows which define an inner corner of the protector. Here, the linear webs are angled outwards towards the corners as they extend to the external bumper wall.

When the protector is subject to a significant impact in the direction of arrow 32 the linear webs and shape of the bumper wall act to cause the external bumper wall to deflect to occupy the position shown in dashed lines. The angle of the linear webs 30 cause the linear webs to tend to bend along their length or pivot about the connection to the plate to allow the deflection of the bumper wall to occur and deflect the movement outwardly relative to the front of the structure. That is alternatively or additionally to the linear webs bending, the webs 30 may be maintained in a substantially linear direction with the connection of the webs to the bumper wall 30 and the inner plate 18 acting as hinges. The end of the webs attached to the bumper move with the bumper when subject to a significant impact such that the bumper may move, at its side regions, inwardly away from the plate 18 and possibly outwardly away from the plate as shown in chain lines. Due to the bulge at the sides of the protector, the external bumper wall is caused to wrap around the sides of the structure thereby acting to cause the force of the impact to dissipate around the structure increasing the damage prevention.

The inner face of the plate 18 may include at least one and preferably several friction elements 34 which may be elastomeric and which may be of rubber. Here, the friction elements can be coextruded or otherwise attached to the surface of the plate either with or without being located in grooves or recesses. Suitably, the friction elements are elongate and arranged to run the length of the protector. When the outwardly facing surface 2 of the structural support contacts these resilient elements (including when the bumper plate is subject to a significant impact) the cooperation of the surface 22 with the elements 34 resists relative sliding movement in both the crosswise direction and the vertical direction. Advantageously, the extruded form of the protector can be formed from a suitable material selected for crush resistance and other surface/material characteristics without having to compromise for slip resistance.

Similar friction elements 36, 38 which may be elastomeric and which may be of rubber may additionally or alternatively be provided along the inwardly facing surface of at least one of the jaw spaced from the end of the jaws and, alternatively or additionally, around the ends of at least one of the jaws. When the structural elements contacts one or more of these frictional elements movement of the protector along the structural element is resisted.

Figure 2:
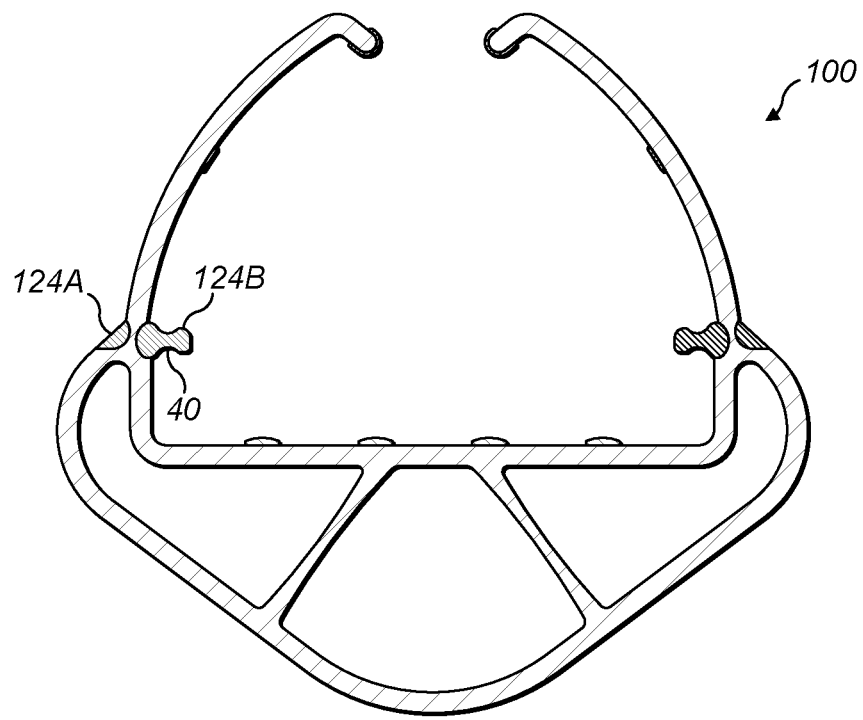
FIG. 2 is a plan view of a protector 100 according to a second embodiment.

FIG. 2 is formed in the same way as FIG. 1 and operates in the same manner. Accordingly only the differences from the embodiment of FIG. 1 will be discussed.

In FIG. 2 the resilient material 124B provided on at least one area of one of the hinges is arrange to extend into the area defined by the jaws and plate and in order to assist to maintain the protector against the structure and to prevent sideways movement. Alternatively, or additionally as the resilient element projects into the space between the hinges the resilient element may come into contact or contact the structural element to assist in maintaining the protector in the correct position or alternatively or additionally may resist movement of the protector along the structural element.

The form of the or each material 124B may include a region of reduced cross section 40 between its ends. These may allow the material to bend when the protector is fitted so that contact with the structural member is maintained. Alternatively or additionally these may allow deflection or compression of the material to allow different widths of structural members to be in contact with the material 124B either by varying degrees of compression or deflection or both of the material 124B.

The resilient material 24A and 24B (or 124A or 124B) may have different properties and, for instance, the material 24A or 124A may have a greater resistance to compression than the material 24B or 124B or vice versa. This may allow, for instance, for the hinge strength or resistance to bending to be altered. Alternatively or additionally where only the outer material 24A or 124A is present at at least one side the material properties can be altered to vary the resistance of the jaw to outwards bending.

The protector including the material 24A, 24B, 124A, 124B, 34, 36 and 38 may be extruded and are preferably coextruded. The material 24, 26 and 38 may be tacky or non-slip material and may not necessarily be resilient. The area of the resilient portions or non-slip portions may be fast with the parts of the protector that they are next to.

One size protector may be able to fit a variety of different sized structural supports. For instance one protector may fit a structural support having a cross width of 100-120 mm with matter another holding a width of 120-140 mm and a further protector fitting 140-160 mm.

Although preferred embodiment(s) of the present invention have been shown and described, it will be appreciated by those skilled in the art that changes may be made without departing from the scope of the invention as defined in the claims.

Advantageously, in a second aspect, there is provided a protector for protecting a structure from impact, the protector being arranged, in use, to be attached to a structure by a pair of opposed jaws, at least one of the jaws including a hinge spaced from the end of the jaw and in which relative movement of the jaws away from each other is arranged to be against a resilient bias of the hinge and a bumper arranged, in use, to be spaced over at least part of its extent from a structure, the bumper being arranged to protect the structure when impacted.

Preferably in the second aspect, the protector includes a narrow section in the region of the or each hinge and resilient material included on the outside of the protector in the region of the narrow section which resilient material is arranged to be compressed or further compressed when relative movement of the jaws away from each other occurs.

Preferably in the second aspect, different resilient materials can be used to alter the resilient bias.

Preferably in the second aspect, the protector includes a resilient material on the inside of the protector arranged to exert a resilient bias in the region of the or each hinge arranged to resist relative movement of the jaws towards each other.

Preferably in the second aspect, the or each resilient bias of the or each jaw is comprised by resilient material that extends towards the opposed jaw which extent is arranged, in use, to be contacted by a structure to be protected.

Preferably in the second aspect, different resilient materials may be used to alter the resilient bias.

There is also provided a structure protected against impact by a protector of the second aspect. Preferably, the jaws are biased into contact with the structure when attached to the structure. Preferably movement of the protector on the structure is at least partially resisted by abutment of the or each further resilient material with the structure.

In a third aspect, a method of forming a protector for protecting a structure against impact comprises forming a pair of opposed jaws and forming at least one of the jaws with a hinge spaced from the end of the jaw and forming a bumper arranged, in use, to be spaced from a structure over at least part of its extent with the bumper being arranged, in use, to protect a structure from impact.

Preferably, the method comprises forming a protector of the second aspect.

In a fourth aspect there is provided a method of attaching a protector to a structure comprising moving a pair of jaws of the protector relative to each other about a hinge of at least one jaw, which hinge is spaced from the end of the jaw on which it is located and causing the jaws to be biased towards each other to clamp the structure, the protector including a bumper spaced from the structure over at least part of its extent arranged to protect the structure from damage when impacted.

Preferably, the or each hinge is moved against a resilient bias when relative movement of the jaws away from each other is affected. Preferably, the method comprises providing a resilient member in the region of a hinge of at least one jaw which projects towards the other jaw engaging the structure when attaching the protector to the structure.

Preferably the method comprises selecting a protector having a different resilient bias prior to connecting the protector to the structure.

According to a fifth aspect, there is provided a protector for protecting a structure from impact, the protector being arranged, in use, to be attached to a structure by a pair of opposed jaws, the protector including a bumper arranged, in use, to be spaced from a structure over at least part of its extent, the bumper being arranged to protect the structure when impacted, the protector including at least one non-slip portion arranged, in use, to be contacted by the structure to resist movement of the protector on the structure.

Preferably in the fifth aspect the non-slip portion is arranged, in use, to contact the structure to resist up and down movement of the protector on the structure.

Preferably in the fifth aspect the non-slip portion is arranged, in use, to contact the structure to resist side to side movement of the protector on the structure.

Preferably in the fifth aspect, in use, at least one of the non-slip portions is biased towards the structure.

Preferably in the fifth aspect the at least one non-slip portion is provided on a plate that, in use, is arranged to face a surface of the structure.

Preferably in the fifth aspect the plate includes a plurality of parallel non-slip portions.

Preferably in the fifth aspect the at least one non-slip portion is provided at an end region of the jaws.

Preferably in the fifth aspect the at least one jaw is movable towards or away from the other jaw about a hinge and a non-slip portion is provided in the region of the hinge.

Preferably in the fifth aspect the protector includes the non-slip portion is extruded.

Preferably in the fifth aspect the non-slip portion is simultaneously extruded.

A structure on which is mounted a protector according to the fifth aspect.

According to a sixth aspect, there is provided a method of forming a protector for protecting a structure against impact comprising forming a pair of jaws, which jaws in use are arranged to connect the protector to a structure, and forming a bumper arranged, in use, to be spaced from a structure over at least part of its extent, the bumper being arranged to protect a structure against impact, and forming a non-slip portion arranged, in use, to be contacted by the structure to resist movement of the protector on the structure.

Preferably in the sixth aspect the non-slip portion or portions are extruded.

The invention claimed is:

1. A protector for protecting a structure from impact, the protector comprising:
   a plate;
   two opposed jaws, one of the jaws being connected at one end of the plate and the other of the jaws being connected at an end of the plate opposite the one end, the two jaws arranged to allow the protector to be fitted to a structure; and
   a bumper that is arranged to extend over a front of the plate at a spaced location therefrom, the bumper connected to and extending from side regions of each one of the jaws, wherein
   at least one of the jaws includes a hinge spaced from its end about which the jaw or jaws can move towards or away from each other and in which the bumper is connected to the or each jaw in the region of the or each hinge,
   the plate is connected to the bumper by linear webs that are angled offset from perpendicular to the plane of the plate, the linear webs extending outwardly toward a side from the plate to the bumper, and sides of the bumper are spaced from the ends of the plate and extend around the ends of the plate to the connection with each of the two jaws.

2. A protector as claimed in claim 1, wherein each web is arranged, in use, to pivot at its connection to the plate and its connection to the bumper when the bumper is subject to an impact.

3. A protector as claimed in claim 1, wherein each web is arranged to bend about its length when the bumper is subject to an impact.

4. A protector as claimed in claim 3, wherein each web is of reduced cross section at a location spaced from the end regions of the web.

5. A protector as claimed in claim 1, wherein at least one of the jaws includes at least one resilient material at the or each hinge, which resilient material is arranged to be compressed or further compressed when the bumper is subject to an impact.

6. A method of protecting a structure against impact comprising attaching the two opposed jaws of the protector of claim 1 to the structure.

7. A method of protecting a structure against impact comprising attaching two opposed jaws of a protector to the structure, the protector comprising:
   a plate, wherein the plate is located adjacent to the structure;
   the two opposed jaws, one of the jaws being connected at one end of the plate and the other of the jaws being connected at an end of the plate opposite the one end; and
   a bumper that is connected to and extends from the jaws and spaced from the structure over at least part of its extent, wherein at least one of the jaws includes a hinge spaced from its end about which the jaw or jaws can move towards or away from each other and in which the bumper is connected to the or each jaw in the region of the or each hinge, the plate being connected to the bumper by linear webs offset to perpendicular to the plane of the plate, the bumper being spaced from the ends of the plate and extending therefrom around the ends of the plate to the connection with each jaw, whereby when the bumper is subject to an impact perpendicular to the center of the plane of the plate, the bumper moves inward towards the plate at the region of impact and outwards away from the ends of the plate at a region inwards of the ends of the plate by allowing the bumper to move relative to the plate at the spaced locations of the bumper from the ends of the plate with the or each web moving with the bumper in the region of the connection of the web to the bumper to protect the structure from impact.

8. A method as claimed in claim 7 further comprising causing each of the webs to pivot at the connection to the plate and the connection to the bumper when the protector is impacted, and
   causing each web to bend about its length when the protector is impacted.

9. A method as claimed in claim 7 further comprising causing the web to bend about its length when the protector is impacted.

10. A method as claimed in claim 7, wherein the or each hinge resiliently biases the jaw towards the other jaw, and whereby, when the bumper is impacted, the resilient biasing at the or each hinge assists in resisting the impact by the resilient biasing being increased.

\* \* \* \* \*